United States Patent [19]

Herlitzek

[11] 4,138,168

[45] Feb. 6, 1979

[54] AXIAL SECURING ASSEMBLY FOR ROLLER OR BALL BEARINGS

[75] Inventor: Werner Herlitzek, Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 862,356

[22] Filed: Dec. 20, 1977

[30] Foreign Application Priority Data

Dec. 22, 1976 [DE] Fed. Rep. of Germany ....... 2658157

[51] Int. Cl.² .............................................. F16C 35/06
[52] U.S. Cl. ................................ 308/189 R; 308/236; 308/DIG. 11
[58] Field of Search ............... 308/184 R, 184 A, 236, 308/26, 216, 189, 207, DIG. 11, 195, 213; 24/256

[56] References Cited

U.S. PATENT DOCUMENTS

| 2,051,704 | 8/1936 | Harris | 308/DIG. 11 |
| 3,401,436 | 9/1968 | Bradshaw | 308/236 X |
| 3,888,597 | 6/1975 | Datta | 308/236 X |

FOREIGN PATENT DOCUMENTS

851182 10/1960 United Kingdom ............ 308/DIG. 11

Primary Examiner—Trygve M. Blix
Assistant Examiner—Douglas C. Butler
Attorney, Agent, or Firm—Karl F. Ross

[57] ABSTRACT

An axial securing assembly for a rolling bearing in which the outer race is received in an undivided housing or housing cover and surrounds an array of bearing balls or rollers relative to which the inner race is rotatable. According to the invention, the housing is formed with a cylindrical bore in which the outer race is received and the outer race is provided with an outwardly open circumferential groove in which a spring ring is partly received. The spring ring extends radially outwardly into an inwardly open groove formed in the cylindrical wall of the housing and the latter is provided with a radial depth equal to or greater than the radial width of the spring ring. Along the periphery of the bearing bore formed in this housing, there is provided at least one recess affording axial access to the ends of the spring ring so that the mounting tool can be inserted into the spring ring to spread the latter apart and permit the spring ring to engage in the outwardly open groove of the outer race.

3 Claims, 2 Drawing Figures

AXIAL SECURING ASSEMBLY FOR ROLLER OR BALL BEARINGS

FIELD OF THE INVENTION

The present invention relates to a bearing assembly and, more particularly, to the axial fixation of a roller bearing in a bore of an undivided housing or housing cover.

BACKGROUND OF THE INVENTION

It is known to mount the outer race assembly in a split or subdivided housing or housing cover in which the two parts of the housing can be spread apart to permit insertion of the outer bearing race and can then be drawn together to secure the latter in place. The bearing assembly can comprise, in addition to the outer race, an inner race and an array of rolling bodies, e.g. balls, disposed between the races. The inner race can be fixed to a sleeve or bushing in which a shaft is received, this shaft being angularly coupled with the bushing or sleeve for rotation relative to the housing.

It is also known to axially fix the rolling bearing with a spring ring which can engage in a groove formed in the cylindrical bore provided in the housing or housing cover. In this case, a face of the housing cover must be formed with a recess, generally of a cylindrical configuration, in order to enable the spring ring to be lodged therein. (Reference is made in this connection to "Das Walzlager in Kraftfarzeug", publication No. 05100 of FAG, Kugelfischer Georg Schafer & Co., Schweinfurt, page 22, FIG. 12; page 154, FIG. 99 and page 155, FIG. 100.) In this case, the side of the housing which is formed with the recess enabling the spring ring to be anchored in the housing must be provided with an additional closure member in the form of a cover disk or plate, ring or threaded connection. Frequently such additional elements are difficult to fabricate, awkward to manipulate, and expensive.

OBJECT OF THE INVENTION

It is the object of the present invention to provide an improved axial fixation for a rolling bearing of the character described, whereby the outer race of the bearing can be held in place by a spring ring, which obviates the disadvantage of the earlier systems described above.

SUMMARY OF THE INVENTION

This object and others which will become apparent hereinafter are attained, in accordance with the present invention, in a bearing assembly which comprises a housing member of the undivided type provided with a cylindrical bore in which the outer bearing race can be received, the outer race surrounding an array of rolling bodies which, in turn, surround the inner race of the bearing which can be connected directly or indirectly to a shaft. According to the invention, between the opposite axially spaced faces of the housing, the cylindrical bore of the housing member is provided with an inwardly open peripheral groove of a radial depth which is in excess of the radial width of a spring ring which can be spread apart so as to be received flush with the cylindrical wall of the bore and enable the outer race to be inserted therein, this outer race having an outwardly open groove into which the spring ring can fit. According to the invention, moreover, along the periphery of this bearing bore in the housing member, there is provided one or more axially open recesses which enable the insertion of the spring-ring spreading tool so that the ends thereof can be spread apart, once the spring ring is inserted into the groove of the housing member, to afford passage of the outer race. The tool can then be closed to permit the spring ring to enter the outwardly open groove of this outer bearing race.

According to another feature of the invention, the radial depth of the groove in the outer bearing race is less than the radial width of the spring ring so that the spring ring effectively holds the outer race and the remainder of the bearing assembly in place within the housing member against axial displacement. The circumferential width of the recess formed in the housing should be sufficient to enable full spreading of the ring so that the inner periphery of the latter is flush with the cylindrical bore is partly recessed outwardly thereof.

The axial fixation of a roller bearing according to the invention has the advantage that it eliminates any need for additional covers, rings or threaded members on the housing to retain the spring ring in place. This not only reduces the cost and simplifies the bearing mounting but also eliminates the possibility of contamination and simplifies fabrication.

Of perhaps greater importance is the face that the roller bearing can be securely fixed in closed, i.e. undivided housings, a problem with earlier bearing mounting systems. In fact, that could only be achieved or undivided housings heretofore at very high cost.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
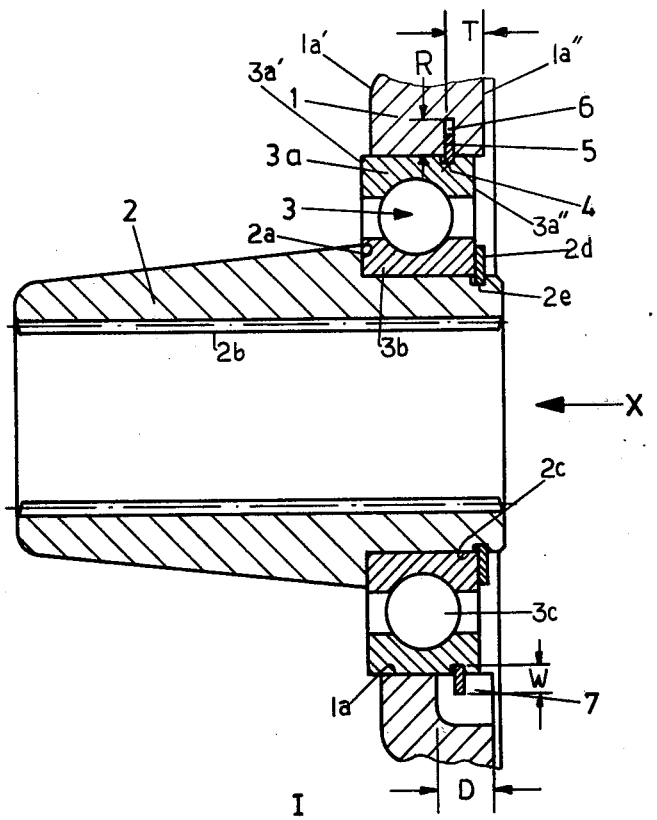
FIG. 1 is a cross-sectional view taken along the line I — I of FIG. 2 through an undivided housing or housing cover in which a roller bearing according to the invention has been axially fixed.
Figure 2:
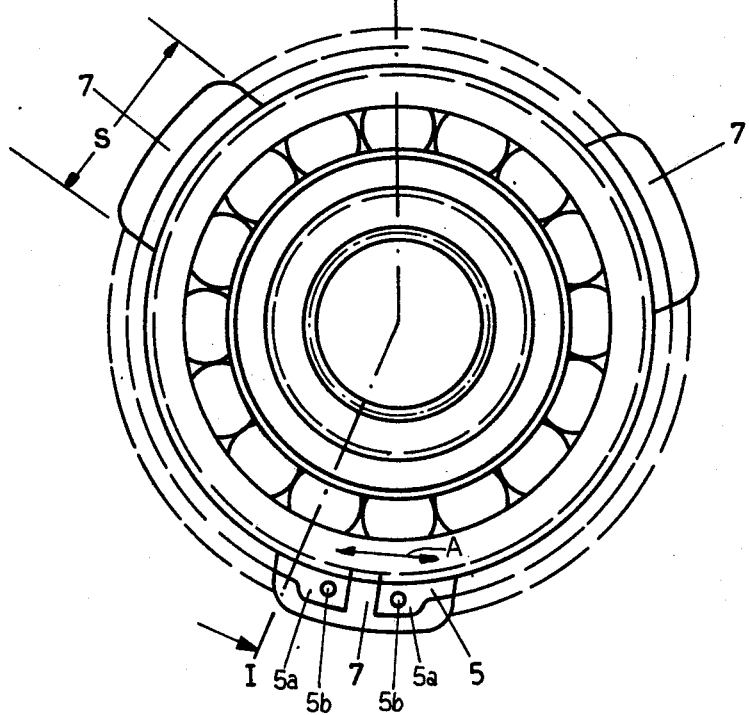
FIG. 2 is an end view taken in the direction of arrow X of FIG. 1.

In the housing member, i.e. the housing or housing cover 1, there is provided a cylindrical bore 1a in which the outer race 3a of the roller bearing 3 is received.

The outer race 3a of the roller bearing 3 is formed between its end faces 3a' and 3a'' with an outwardly open circumferential groove 4 of rectangular profile, this groove having a radial depth which is less than the radial width W of a spring ring 5 which is internally biased by its inherent spring force into the groove. Thus a portion of the spring ring 5 reaches radially outwardly into the rectangular-cross-section circumferential groove 6 formed in the wall 1a of the housing 1. The groove 6 is also located between the end faces 1a' and 1a'' of the housing or housing cover 1.

The groove 6 also has a radial depth R which is at least equal to the radial width W of the spring ring so that the latter can be outwardly spread fully into the groove 6 to enable the race 3a to be inserted axially in the direction of arrow X.

To enable the outward spreading of the spring ring 5, the latter has, in accordance with conventional spring ring design, a pair of terminal lugs 5a, each of which is provided with a small hole 5b into which the pins of a spreading tool can be inserted.

To afford access to the lugs 5a in the axial direction, i.e. from the right-hand side of the housing by insertion of the tool in the direction of arrow X, the housing 1 is formed along the circumference of the cylindrical bore 1a with at least one and preferably three angularly equispaced open recesses 7 which have a depth D greater than the distance T to which the spring ring 5 is inserted from the face 1a'', as can be seen in FIG. 1. The circumferential width S of the recesses 7 is sufficient to enable separation of the lugs 5a in the direction of arrows A to permit full recessing of the spring ring 5 in the groove 7.

In order to remove the bearing assembly, it is simply necessary to spread the spring ring 5 again and axially withdraw the bearing 3. The bearing 3 comprises, in addition to the outer race 3a, an inner race 3b and a plurality of roller bodies 3c here shown as balls for a ball bearing. The inner race 3b can rest against a shoulder 2a of a bushing or sleeve 2 which can form a hollow shaft and can be provided with internal splines 2b for engagement with an outwardly splined solid shaft if desired. The inner race 3b rests upon a cylindrical portion 2c of the hollow shaft 2 and is anchored against the shoulder 2a by an inwardly biased spring ring 2d partly received in an outwardly open recess 2e of the hollow shaft 2.

I claim:

1. A bearing assembly comprising:
    an undivided housing member formed with a cylindrical bore and provided between opposite axial faces of said member with an inwardly open circumferential groove;
    a rolling bearing received in said bore and comprising a cylindrical outer race close-fitting in said bore, an inner race and a plurality of rolling bodies between said races, said outer race being formed with an outwardly open circumferential groove; and
    a spring ring received in said grooves and having a pair of symmetrical flat lugs lying in the plane of the remainder of said ring, each lug having a hole, said member being formed along one of said faces and adjacent said bore with an axially open recess of limited circumferential dimension extending to said inwardly open groove but terminating short of the other face for receiving a tool engageable in the holes of said lugs of said spring ring to enable the spreading thereof into said inwardly open groove to permit insertion of said outer race into and removal of said outer race from said bore, said inwardly open groove having a radial depth at least equal to the radial width of said spring ring, said outwardly open groove having a radial depth less than the radial width of said spring ring, said recess having a circumferential length sufficient to enable spreading of the ends of said spring ring for full recessing of said spring ring by said tool into said inwardly open groove.

2. The assembly defined in claim 1 wherein a plurality of such recesses are provided in said member in angularly equispaced relationship along said bore.

3. The assembly defined in claim 1 further comprising an internally splined hollow shaft received in said inner race, said hollow shaft being provided with a cylindrical portion surrounded by said inner race and terminating in a shoulder against which said inner race abuts, said assembly including a further spring ring received in an outwardly open groove formed in said shaft and retaining said inner race against said shoulder, said bodies being balls.

* * * * *